United States Patent [19]

Shieh et al.

[11] Patent Number: 6,065,059

[45] Date of Patent: *May 16, 2000

[54] FILTERED UTILIZATION OF INTERNET DATA TRANSFERS TO REDUCE DELAY AND INCREASE USER CONTROL

[75] Inventors: Johnny Meng-Han Shieh; John Maddalozzo, Jr.; Gerald Francis McBrearty, all of Austin, Tex.

[73] Assignee: International Business Machines Corporation, Armonk, N.Y.

[ * ] Notice: This patent is subject to a terminal disclaimer.

[21] Appl. No.: 08/762,911

[22] Filed: Dec. 10, 1996

[51] Int. Cl.[7] ............................. G06F 13/38; G06F 15/17
[52] U.S. Cl. ........................ 709/233; 709/204; 709/208; 709/219; 709/223; 709/224; 709/225; 709/231; 709/233; 370/229; 370/488
[58] Field of Search ..................................... 709/229, 223, 709/224, 233; 380/49; 340/825; 714/39, 47; 370/252

[56] References Cited

U.S. PATENT DOCUMENTS

| | | | |
|---|---|---|---|
| 4,771,391 | 9/1988 | Blasbalg ................................. | 709/232 |
| 4,853,875 | 8/1989 | Brown et al. ........................... | 709/228 |
| 4,901,277 | 2/1990 | Soloway et al. ....................... | 709/233 |
| 5,161,215 | 11/1992 | Kuoda et al. ........................... | 711/119 |
| 5,165,021 | 11/1992 | Wu et al. ............................... | 709/234 |
| 5,237,676 | 8/1993 | Arimilli et al. ........................ | 710/110 |
| 5,301,351 | 4/1994 | Jippo ..................................... | 709/233 |
| 5,367,523 | 11/1994 | Chang et al. .......................... | 370/235 |
| 5,408,613 | 4/1995 | Okabayashi ........................... | 709/234 |
| 5,493,355 | 2/1996 | Kazami ................................. | 396/319 |
| 5,519,704 | 5/1996 | Farinacci et al. ...................... | 370/402 |
| 5,544,317 | 8/1996 | Berg ....................................... | 709/235 |
| 5,555,377 | 9/1996 | Christensen et al. .................. | 709/247 |
| 5,572,643 | 11/1996 | Judson .................................. | 709/247 |
| 5,627,970 | 5/1997 | Keshav .................................. | 709/233 |
| 5,673,322 | 9/1997 | Pepe et al. .............................. | 380/49 |
| 5,694,546 | 12/1997 | Reisman ................................ | 705/26 |
| 5,701,451 | 12/1997 | Rogers et al. .......................... | 707/1 |
| 5,708,780 | 1/1998 | Levergood et al. ................... | 709/229 |
| 5,710,918 | 1/1998 | Largarde et al. ...................... | 707/10 |
| 5,737,619 | 4/1998 | Judson .................................. | 707/500 |
| 5,764,235 | 6/1998 | Hunt ...................................... | 345/428 |
| 5,819,048 | 10/1998 | Okazaki et al. ....................... | 709/233 |
| 5,881,240 | 3/1999 | Asano .................................... | 709/233 |
| 5,896,502 | 4/1999 | Shieh et al. ............................ | 709/224 |
| 5,913,041 | 6/1999 | Ramanathan et al. ................. | 709/233 |

OTHER PUBLICATIONS

Newsletter, Iterated Systems, Iterated extends fractal imaging capability to the Macintosh, M2 communications, 2, Aug. 19, 1994.

*Primary Examiner*—Frank J. Asta
*Assistant Examiner*—Bunjob Jaroenchonwanit
*Attorney, Agent, or Firm*—Sawyer & Associates; Leslie A. Van Leeuwen

[57] ABSTRACT

Method and system aspects for allowing user control of data transfer from websites on the Internet via a web browser on a client system are presented. A method aspect includes establishing limits for allowable connections in the client system, and communicating the limits from the client system to a server system hosting a selected website. The method further includes comparing within the server a current transfer session to the communicated limits for allowable connections, and controlling the current transfer session by the server according to comparison results.

A system for allowing user control of data transfer from websites on the Internet includes a client system, the client system requesting connection to a remote website with established limits. The system further includes a server system, the server system hosting the remote website and receiving the request for connection with established limits, wherein the server system compares the established limits with current transfer session conditions and controls data transfer accordingly.

18 Claims, 2 Drawing Sheets

FILTERED UTILIZATION OF INTERNET DATA TRANSFERS TO REDUCE DELAY AND INCREASE USER CONTROL

RELATED APPLICATIONS

The present invention is related to U.S. Pat. No. 5,896,502, entitled INTERNET DATA TRANSFER CONTROL VIA A CLIENT SYSTEM TO REDUCE DELAY, and to U.S. Pat. No. 5,933,600, entitled INCREASED CONTROL FOR REDUCED DELAY IN INTERNET DATA TRANSFERS BASED ON LIMITATIONS ESTABLISHED IN A SERVER SYSTEM both filed on Dec. 10, 1996, and assigned to the assignee of the present invention.

TECHNICAL FIELD

This patent application is related to utilizing the Internet via web browsers, and more particularly to a filtered utilization of the Internet via web browsers.

BACKGROUND

Utilization of the World Wide Web, i.e., a global hypermedia document that resides on and stretches across most of the Internet, commonly involves a web browser interface program, such as Netscape Navigator, to access hypermedia documents, commonly referred to as web pages. Sites on the Internet are chosen by a user usually by entering a site address, i.e., a URL (uniform resource locator), or by selecting a link on a displayed web page of a current site. A typical arrangement for such utilization is illustrated by the block diagram of FIG. 1. A user on a client computer system 10 addresses a web site hosted by a remote server system 12. The remote server 12 accesses the chosen web site by locating a local file 14 storing the data for the addressed web site. The remote server 12 then transfers the data for the website to the client system 10. With the World Wide Web utilizing a standard protocol, e.g., HyperText Transfer Protocol (HTTP), for transferring information across the Internet and web software following this protocol, information transfer occurs between the remote server 12 and client system 10.

During the process of requesting a site and transferring data, the client system 10 waits. Unfortunately when the site being accessed contains large image files, the wait for data transfer can become excessive. Also, in certain situations, such as international web sites or sites with server problems, data transfer is slow. The time wasted waiting is not only inconvenient to the user, but may be costly for those situations in which users pay for use of the Internet based on the length of connection time.

Usual attempts to end the delay involve the selection of a stop transfer function, e.g., selection of a stop button icon in the web browser. While the delay is ended, the selection of the stop function completely ends data transfer, thus stopping not only a large image transfer but the transfer of text information in the information stream from the server as well. Alternatively, the user can choose to speed up transfer by switching to a text only, ASCII version for the browser interface. Of course, the elimination of images from the interface defeats the purpose of the having a graphical browser for the web pages and limits the depth of the information provided.

Accordingly, what is needed is a system that allows more flexible and convenient control over the transfer of data, including image data, between client and server systems on the Internet.

SUMMARY

The present invention meets these needs through method and system aspects for allowing user control of data transfer from websites on the Internet via a web browser on a client system. A method aspect includes establishing limits for allowable connections in the client system, and communicating the limits from the client system to a server system hosting a selected website. The method further includes comparing within the server a current transfer session to the communicated limits for allowable connections, and controlling the current transfer session by the server according to comparison results.

In another method aspect, the method includes determining whether a selected link is an allowable link type, proceeding with loading of the selected link when the selected link is an allowable link type, determining whether the loading of the selected link exceeds a predetermined time period, and proceeding with loading of the selected link when the loading does not exceed a predetermined time period. The method further includes determining whether image data from the selected link exceeds a maximum size for image data, and completing the loading of the selected link when the image data from the selected link does not exceed the maximum size for image data.

In a system aspect, a system for allowing user control of data transfer from websites on the Internet includes a client system, the client system requesting connection to a remote website with established limits. The system further includes a server system, the server system hosting the remote website and receiving the request for connection with established limits, wherein the server system compares the established limits with current transfer session conditions and controls data transfer accordingly.

With the present invention, more efficient transfer of data from a server system hosting a website to a client system requesting access to the website is achieved. Limitations for maximum image size and length of time for transfer attempts readily facilitate reduction in delays commonly associated with data transfers on the Internet. These and other advantages will be more fully understood with the following detailed description in conjunction with the accompanying drawings.

DETAILED DESCRIPTION

The present invention relates to providing greater user control in the process of transferring data on the Internet via web browsers. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

In accordance with preferred embodiments of the present invention, flexible limits are capably included to provide better control over Internet data transfer via a web browser. The following provides descriptions of controls based on image size limits, time of transfer limits, and allowed link limits. Of course, the principles of the present invention may be extended to include other limits without departing from the spirit and scope of the present invention. Further, in the following discussion, references to client systems and server systems suitably refer to appropriate computer systems that handle Internet interaction by well known techniques. The references to programming in the system and alterations to those programs are suitably stored on computer readable mediums, such as hard disk drives, as is well understood by those skilled in the art.

Figure 1:
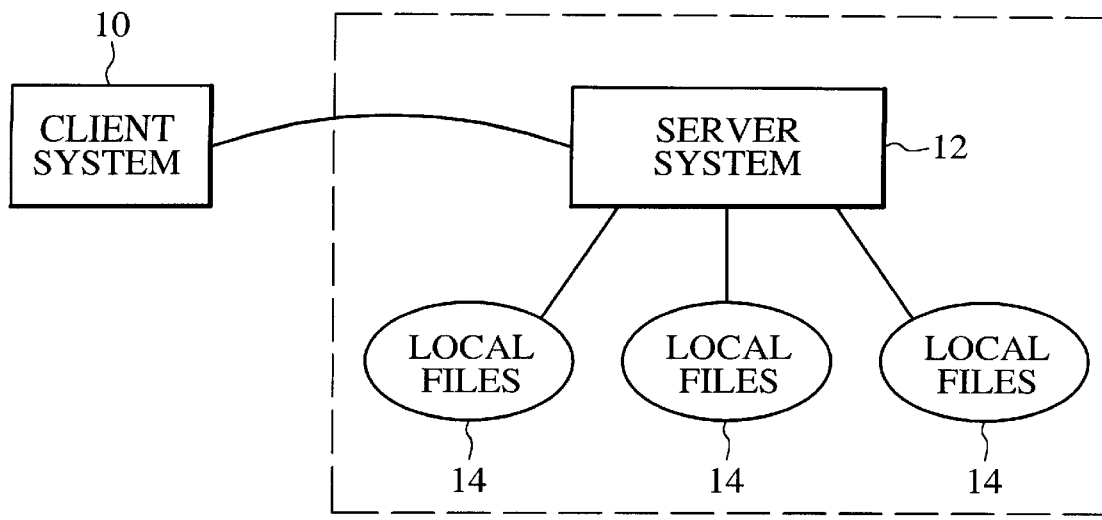
FIG. 1 illustrates a typical client-server system arrangement for Internet site access.
Figure 2:
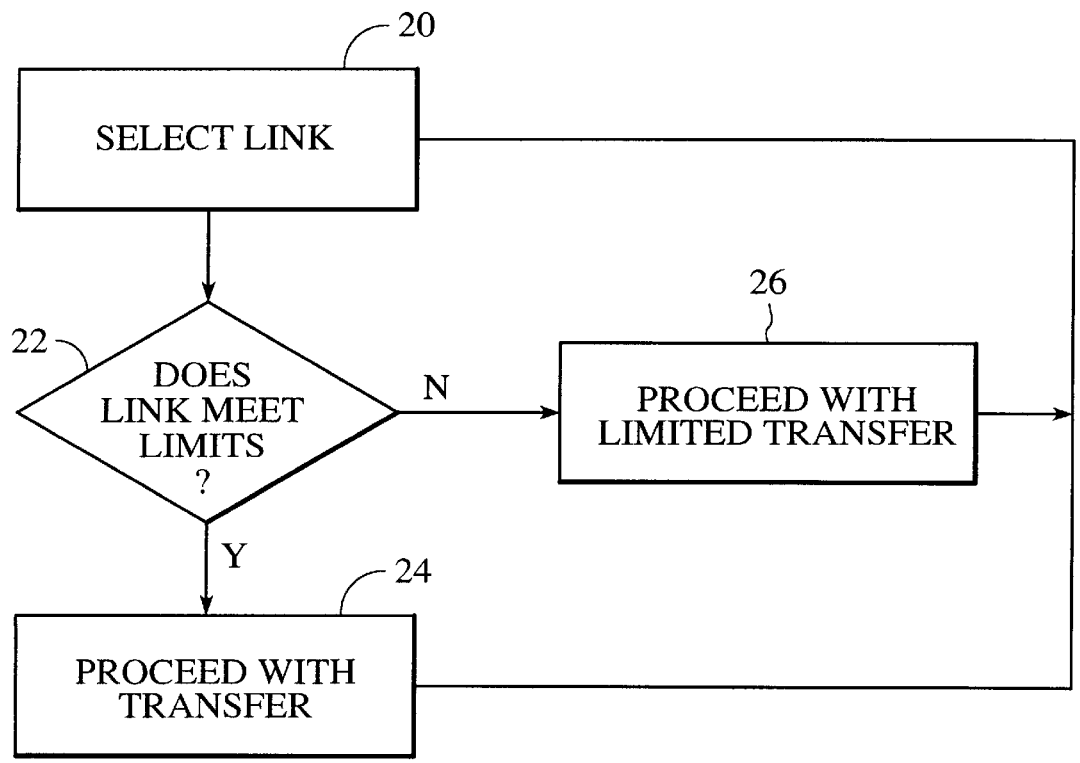
FIG. 2 illustrates a flow diagram of filtered utilization of Internet access in accordance with the present invention.
Figure 3:
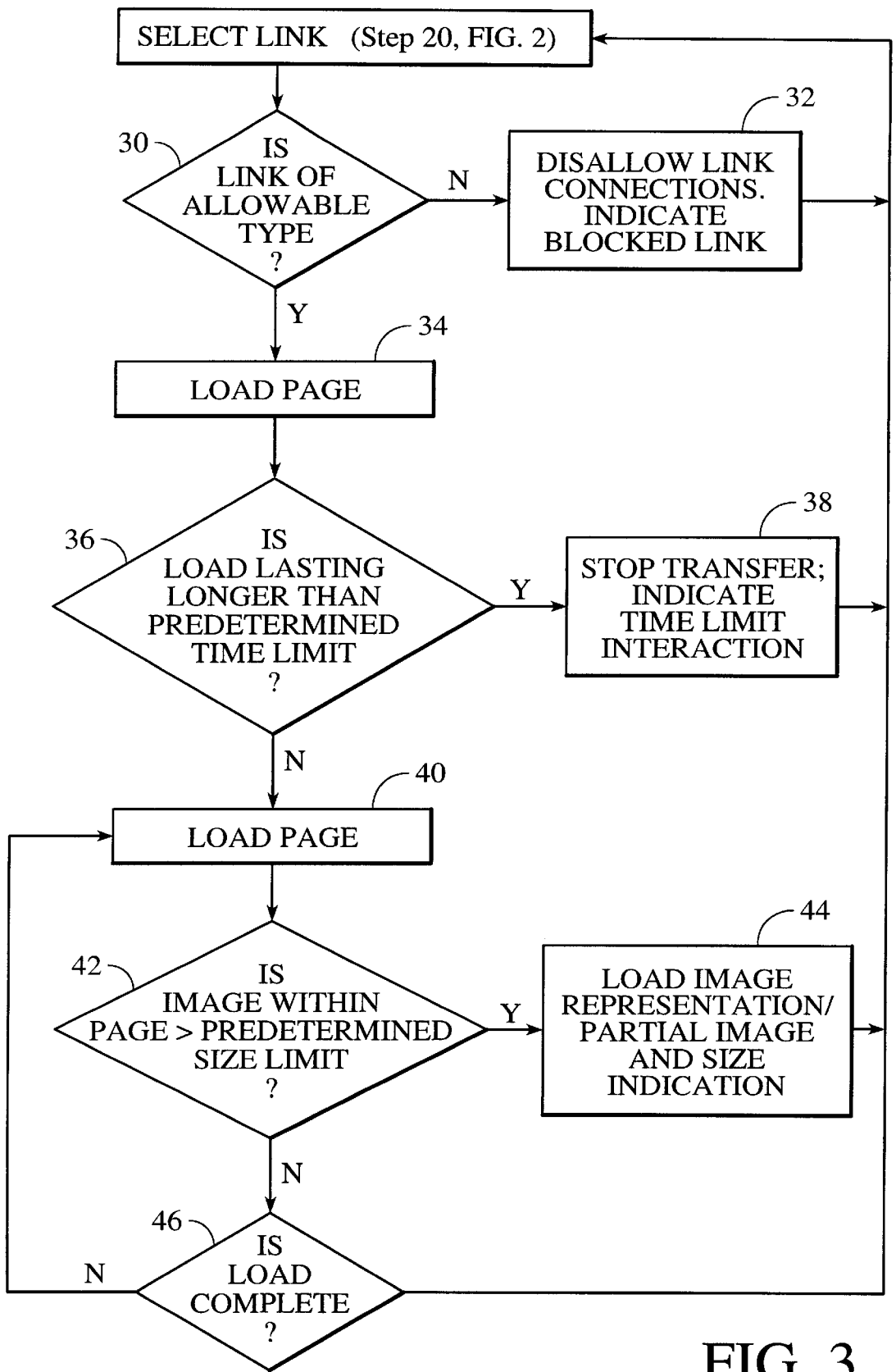
FIG. 3 illustrates a more detailed flow diagram of preferred embodiments of filtered utilization of Internet access.

The preferred embodiments are provided generally by the flow diagram of FIG. 2 with a more detailed discussion of specific embodiments with reference to the flow chart of FIG. 3. Referring to FIG. 2, the process begins with the selection of a link (step 20) by a user on a client system 10 (FIG. 1) to establish a current transfer session, where a link suitably refers to a web address entered as an address string, e.g., an http://string for an html (hypertext mark-up language) environment, or represented by an image, icon, or text label in a web page, such as an html document. The process then continues by determining whether the selected link is within established limits (step 22). The established limits preferably refer to image size limits, time of transfer limits, and allowed link limits. When the selected link does meet the established limits, the process proceeds with standard link connection and data transfer (step 24), as is well known to those skilled in the art, before repetition of the process with a next selected link (step 20). When the selected link does not meet all the established limits, the process proceeds with a limited data transfer, including no data transfer, (step 26), in accordance with the present invention before returning and repeating the process for a next selected link (step 20).

FIG. 3 illustrates more particularly processes involved in determining whether the selected link is within established limits (step 22, FIG. 2) and providing limited data transfer (step 26, FIG. 2). It should be appreciated that although a particular sequence of determinations is presented, the sequence, types, and numbers of determinations may be altered according to particular needs and desired implementations of limit selections without departing from the spirit and scope of the present invention.

Link Type Limitations

As shown in FIG. 3, once a link is selected (step 20, FIG. 2), a determination of whether the link is an allowable link or link type is suitably made (step 30). By way of example, a user on a client system 10 or an administrator on a server system 12 suitably establishes a list of specific links, such as links for pornographic web sites, that are not allowed for connection and data transfer to restrict access, such as by children, to such links. The determination suitably occurs by altering the client system's 10 or server system's 12 programming to perform a comparison between the selected requestor list and a stored set of unallowed links. Once the determination is completed, when the selected requestor list does match an unallowed link, data transfer is suitably not allowed and an indication of no connection due to a blocked link is preferably provided on a display of the client system 10 (step 32). The process then continues with a next selected link (step 20).

Time to Load Limitation

When the selected requestor list is an allowed link, suitably the link is established and loading of the data for a web page associated with the link is begun (step 34). A next determination occurs by determining whether the time spent loading the web page is taking longer than a predetermined time period, e.g., approximately 45–60 seconds, (step 36). The necessary programming to perform the comparison is suitably provided by the client system 10 or by the server system 12 to automatically check for transfers taking longer than the predetermined time period. Alternatively, communication of the time period limit by the client system 10 to the server system 12 occurs to allow the server system 12 to perform the comparison. When the time limit is exceeded, suitably the attempt to transfer is stopped and an indication that the transfer exceeded the time limit is provided on the client system (step 38) before processing continues with a next selected link (step 20).

Image Size Limitation

When the time limit is not exceeded, loading of the web page continues (step 40). As images in the web page are being transferred, preferably a determination of whether an image exceeds a predetermined number of bytes, e.g., 50 Kbytes (kilobytes), is made (step 42). When the image does exceed the predetermined number of bytes, suitably the transfer of the image does not fully proceed (step 44). In one embodiment, the transfer of the image is suitably stopped and a representation of the image, such as by an image icon, along with an indication of the image's size acts as a replacement for the image in the display of the web page. Alternatively, the image is suitably loaded until the size limit is reached, so that a partial image with an indication of the total size of the image remains on the web page. The comparison programming and control of display of a partial image or image representation and size indication is suitably included in the client system 10 or in the server system 12. When done by the server system 12, preferably the server system 12 only transfers full images less than the size limit and transfers a representation or partial image with the size indication for images above the size limit. Alternatively, the client system 10 suitably communicates to the server system 12 the size limit for images that the server system 12 then is programmed to monitor with the client system 10 or server system 12 providing the representation for the images exceeding the size limit in the web page.

Once the partial image/image representation processing is complete or when the image is less than the predetermined size limit, the process continues with the loading of the web page (step 40) until the loading is completed, as determined via step 46. Once the loading is completed, the process continues with a next selected link (step 20). Of course, a next selected link may include a link associated with an image only partially displayed or an image representation associated with an image that exceeded the size limitation.

Suitably, when the client system 10 is used to control the limits, the browser program supports selection of the limits by a user through a chosen set of limit control functions. By way of example, the set of limit control functions may be capably accessed via a separate pull down menu in the graphical interface of the browser program. Further, in order to provide greater control over the selection of limits, the ability to change the limits may be restricted by use of a user-selected password, as would be desirable when restricting children's access to selected links. Further, for the embodiments where the client system 10 and server system 12 interact together to provide the necessary monitoring and filtering process, in addition to alterations in the programming of each system, an alteration to the communication programming for data transfer between the systems suitably occurs to ensure proper translation of limits and corresponding filtering results. By way of example, an appropriate alteration provides standard identification for limit indications in the hypertext transfer protocol and html programming for the web pages.

With the embodiments of the present invention, greater user control over the transfer of data from a remote Internet location to a local system is achieved. By restricting access to particular websites or types of websites, users avoid wasting time downloading data from predetermined undesirable locations. Further, by limiting the amount of time transfers may take, users gain greater control by avoiding the inefficiency of waiting for a transfer from a problematic server. In addition, the authority to set a maximum image size provides great flexibility and avoids the frustration of restricting information transfer to text-only to increase transfer speed. Further, the user is better able to still receive the textual data and image data below the maximum size to maintain the integrity of the graphical interface without being slowed by excessive transfer times for image files.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for allowing user control of data transfer from websites on the Internet via a web browser on a client system, the method comprising:

establishing limits for allowable connections in the client system;

communicating the limits from the client system to a server system hosting a selected website;

comparing within the server a current transfer session to the communicated limits for allowable connections; and controlling the current transfer session by the server according to comparison results.

2. The method of claim 1 wherein establishing limits further comprises establishing maximum image data size limits.

3. The method of claim 1 wherein establishing limits further comprises establishing maximum time of transfer limits.

4. The method of claim 1 wherein establishing limits further comprises establishing a list of unallowable links.

5. The method of claim 1 wherein controlling the transfer session further comprises stopping the current transfer session.

6. The method of claim 1 wherein controlling the transfer session further comprises maintaining textual data transfer with partial image representation transfer.

7. A system for allowing user control of data transfer from websites on the Internet, the system comprising:

a client system, the client system requesting connection to a remote website with established limits; and a server system, the server system hosting the remote website and receiving the request for connection with established limits, wherein the server system compares the established limits with current transfer session conditions and controls data transfer accordingly.

8. The system of claim 7 wherein the client system establishes maximum image data size limits.

9. The system of claim 7 wherein the server system controls data transfer by maintaining textual data transfer with partial image representation transfer.

10. A system for allowing user control of data transfer from websites on the Internet, the system comprising:

a client system, the client system requesting, connection to a remote website with established limits, wherein the client system establishes maximum time of transfer limits; and a server system, the server system hosting the remote website and receiving the request for connection with established limits, wherein the server system compares the established limits with current transfer session conditions and controls data transfer accordingly.

11. A system for allowing user control of data transfer from websites on the Internet, the system comprising:

a client system, the client system requesting connection to a remote website with established limits, wherein the client system establishes a list of unallowable links; and a server system, the server system hosting the remote website and receiving the request for connection with established limits, wherein the server system compares the established limits with current transfer session conditions and controls data transfer accordingly.

12. A system for allowing user control of data transfer from websites on the Internet, the system comprising:

a client system, the client system requesting connection to a remote website with established limits; and a server system the server system hosting the remote website and receiving the request for connection with established limits, wherein the server system compares the established limits with current transfer session conditions and controls data transfer accordingly by stopping the current transfer session.

13. A method for allowing user control of data transfer from websites on the Internet via a web browser on a client system, the method comprising:

determining whether a selected link is an allowable link type;

proceeding with loading of the selected link when the selected link is an allowable link type;

determining whether the loading of the selected link exceeds a predetermined time period;

proceeding with loading of the selected link when the loading does not exceed a predetermined time period;

determining whether image data from the selected link exceeds a maximum size for image data; and completing the loading of the selected link when the image data from the selected link does not exceed the maximum size for image data.

14. The method of claim 13 further comprising disallowing data transfer when the selected link is not an allowable link type.

15. The method of claim 13 further comprising stopping the loading of the selected link when the loading does exceed a predetermined time period.

16. The method of claim 13 further comprising loading an image representation and size indication when the image data does exceed the maximum size for image data.

17. The method of claim 13 further comprising loading a partial image until the maximum size for image data is reached without limiting loading of textual data.

18. A computer readable medium containing program instructions for allowing user control of data transfer from websites on the Internet via a web browser on a client system, the program instructions comprising:

establishing limits for allowable connections in the client system;

communicating the limits from the client system to a server system hosting a selected website;

comparing within the server a current transfer session to the communicated limits for allowable connections; and controlling the current transfer session by the server according to comparison results.

\* \* \* \* \*